United States Patent
McGraw et al.

(10) Patent No.: US 10,158,761 B2
(45) Date of Patent: Dec. 18, 2018

(54) SYSTEM AND METHOD FOR DISTRIBUTED DYNAMIC RESOURCE COMMITMENT

(71) Applicant: Genesys Telecommunications Laboratories, Inc., Daly City, CA (US)

(72) Inventors: Kevin McGraw, Saint John (CA);
Derrick Gunter, Saint John (CA);
Taras Mytropan, Saint John (CA);
David Albert, Saint John (CA);
Herbert Willi Artur Ristock, Walnut Creek, CA (US)

( * ) Notice: Subject to any disclaimer, the term of this patent is extended or adjusted under 35 U.S.C. 154(b) by 120 days.

(21) Appl. No.: 15/282,972

(22) Filed: Sep. 30, 2016

(65) Prior Publication Data

US 2018/0097939 A1 Apr. 5, 2018

(51) Int. Cl.
*H04M 3/523* (2006.01)
*H04M 3/51* (2006.01)

(52) U.S. Cl.
CPC ........ *H04M 3/5233* (2013.01); *H04M 3/5141* (2013.01); *H04M 2203/402* (2013.01)

(58) Field of Classification Search
CPC .. H04M 3/5141; H04M 3/523; H04M 3/5232; H04M 3/5233
See application file for complete search history.

(56) References Cited

U.S. PATENT DOCUMENTS

| 8,259,924 B2 | 9/2012 | Korolev et al. |
| 8,351,594 B2 | 1/2013 | Ristock et al. |
| 2006/0041444 A1 | 2/2006 | Flores et al. |
| 2010/0266115 A1 | 10/2010 | Fedorov et al. |
| 2010/0266116 A1 | 10/2010 | Stoylar et al. |
| 2011/0255683 A1* | 10/2011 | Flockhart ............... G06Q 10/06 379/266.01 |
| 2014/0022328 A1 | 1/2014 | Gechter et al. |
| 2014/0140498 A1* | 5/2014 | Mezhibovsky ..... H04M 3/5232 379/265.13 |
| 2014/0161248 A1 | 6/2014 | Steiner et al. |

FOREIGN PATENT DOCUMENTS

WO 2014085760 A1 6/2014

OTHER PUBLICATIONS

International Search Report and Written Opinion for Application No. PCT/US2017/053744, dated Jan. 26, 2018, 16 pages.

* cited by examiner

*Primary Examiner* — Nafiz E Hoque

(57) ABSTRACT

A system for managing resource commitment in a contact center includes: a processor; and a memory, wherein the memory stores instructions that cause the processor to: receive over a shared data communications channel a request for contact center resources, wherein the request is for handling activities for the contact center having an activity type; transmit a signal to initiate a raise round according to the request over the data communications channel to a pool of resources registered to communicate on the data communications channel; receive a plurality of volunteer signals from a plurality of volunteering resources from the pool of resources; select one or more of the plurality of the volunteering resources for fulfilling the request; and transmit a message to the selected volunteering resources for committing the selected volunteering resources to the request, wherein the committed resources are selected for routing an activity having the activity type.

20 Claims, 12 Drawing Sheets

SYSTEM AND METHOD FOR DISTRIBUTED DYNAMIC RESOURCE COMMITMENT

BACKGROUND

1. Field

One or more aspects of example embodiments of the present invention relate to a system and method for dynamic resource commitment/un-commitment in a contact center system.

2. Description of the Related Art

A modern contact center may be viewed as a system of interconnected resources. These resources may include physical devices (e.g. computer systems, telephony servers, unified communication-type platforms, and the like), software objects (e.g. individual telephony objects such as directory numbers, login objects, and the like), and actors acting on the physical devices and/or telephony objects (e.g. human agents, knowledge workers, computerized automated systems, and the like). Typically, to maintain operational effectiveness over time (e.g., peak time), the resources may be committed to a contact center system. However, commitment of the resources to the contact center system may result in underutilization for some of the resources during an operational period (e.g., below peak time). The underutilization of resources during the operational period may be considered as wasting resources of the system, and may add a real cost that may be quantified not only in potential human/machine capital costs, but also in performance and energy costs of the entire system.

The above information discussed in this Background section is only for enhancement of understanding of the background of the described technology, and therefore, it may contain information that does not constitute prior art.

SUMMARY

One or more aspects of example embodiments of the present invention relate to a system and method for dynamically committing or un-committing resources in a contact center system.

According to an example embodiment of the present invention, a system for managing resource commitment in a contact center includes: a processor; and a memory coupled to the processor, wherein the memory stores instructions that, when executed by the processor, cause the processor to: receive over a shared data communications channel a request for contact center resources, wherein the request is for handling activities for the contact center having an activity type; transmit a signal to initiate a raise round according to the request over the shared data communications channel to a pool of resources registered to communicate on the shared data communications channel, wherein each resource in the pool of resources hosts logic for determining whether the resource should volunteer for the type of activity during the raise round, and in response to determining that the resource should volunteer, the host logic is configured to automatically transmit a volunteer signal over the shared data communications channel; receive a plurality of volunteer signals from a plurality of volunteering resources from the pool of resources; select one or more of the plurality of the volunteering resources for fulfilling the request; and transmit a message to the selected volunteering resources for committing the selected volunteering resources to the request, wherein the committed resources are selected for routing an activity having the activity type.

In an example embodiment, the raise round signal may be received by each of the resources in the pool concurrently via the shared data communications channel.

In an example embodiment, the volunteer signals may be received by each of the resources in the pool concurrently via the shared data communications channel.

In an example embodiment, the determining of whether the resource should volunteer may be based on a number of resources requested and how many other resources volunteer.

In an example embodiment, the determining of whether the resource should volunteer may be further based on a time remaining for the raise round.

In an example embodiment, the determining of whether the resource should volunteer may be based on the resource's own response rate to previous requests or response rates of other resources to previous requests.

In an example embodiment, the pool of resources may be associated with a particular skill, and each resource in the pool of resources may have the particular skill.

In an example embodiment, the request for contact center resources may specify a particular skill, and the determining of whether the resource should volunteer may be based on whether the resource has the particular skill.

In an example embodiment, at least one resource in the pool of resources may be located in a different geographical location from other resources in the pool of resources.

In an example embodiment, resources form among the pool of resources may include at least one of a human agent, computer system, telephony server, and directory number.

According to an example embodiment of the present invention, a method for managing resource commitment in a contact center includes: receiving, by a processor, over a shared data communications channel a request for contact center resource, wherein the request is for handling activities for the contact center having an activity type; transmitting, by the processor, a signal to initiate a raise round according to the request over the shared data communications channel to a pool of resources registered to communicate on the data communications channel, wherein each resource in the pool of resources hosts logic for determining whether the resource should volunteer for the type of activity during the raise round, and in response to determining that the resource should volunteer, the host logic is configured to automatically transmit a volunteer signal over the data communications channel; receiving, by the processor, a plurality of volunteer signals from a plurality of volunteering resources from the pool of resources; selecting, by the processor, one or more of the plurality of the volunteering resources for fulfilling the request; and transmitting, by the processor, a message to the selected volunteering resources for committing the selected volunteering resources to the request, wherein the committed resources are selected for routing an activity having the activity type.

In an example embodiment, the raise round signal may be received by each of the resources in the pool concurrently via the shared data communications channel.

In an example embodiment, the volunteer signals may be received by each of the resources in the pool concurrently via the shared data communications channel.

In an example embodiment, the determining of whether the resource should volunteer may be based on a number of resources requested and how many other resources volunteer.

In an example embodiment, the determining of whether the resource should volunteer may be further based on a time remaining for the raise round.

In an example embodiment, the determining of whether the resource should volunteer may be based on the resource's own response rate to previous requests or response rates of other resources to previous requests.

In an example embodiment, the pool of resources may be associated with a particular skill, and each resource in the pool of resources may have the particular skill.

In an example embodiment, the request for contact center resources may specify a particular skill, and the determining of whether the resource should volunteer may be based on whether the resource has the particular skill.

In an example embodiment, at least one resource in the pool of resources may be located in a different geographical location from other resources in the pool of resources.

According to an example embodiment of the present invention, a system for managing resource commitment in a contact center includes: means for receiving over a shared data communications channel a request for contact center resources, wherein the request is for handling activities for the contact center having an activity type; means for transmitting a signal to initiate a raise round according to the request over the data communications channel to a pool of resources registered to communicate on the data communications channel, wherein each resource in the pool of resources hosts logic for determining whether the resource should volunteer for the type of activity during the raise round, and in response to determining that the resource should volunteer, the host logic is configured to automatically transmit a volunteer signal over the data communications channel; means for receiving a plurality of volunteer signals from a plurality of volunteering resources from the pool of resources; means for selecting one or more of the plurality of the volunteering resources for fulfilling the request; and means for transmitting a message to the selected volunteering resources for committing the selected volunteering resources to the request, wherein the committed resources are selected for routing an activity having the activity type.

BRIEF DESCRIPTION OF THE DRAWINGS

The above and other aspects and features of the present invention will become more apparent to those skilled in the art from the following detailed description of the example embodiments with reference to the accompanying drawings.

DETAILED DESCRIPTION

Figure 1:
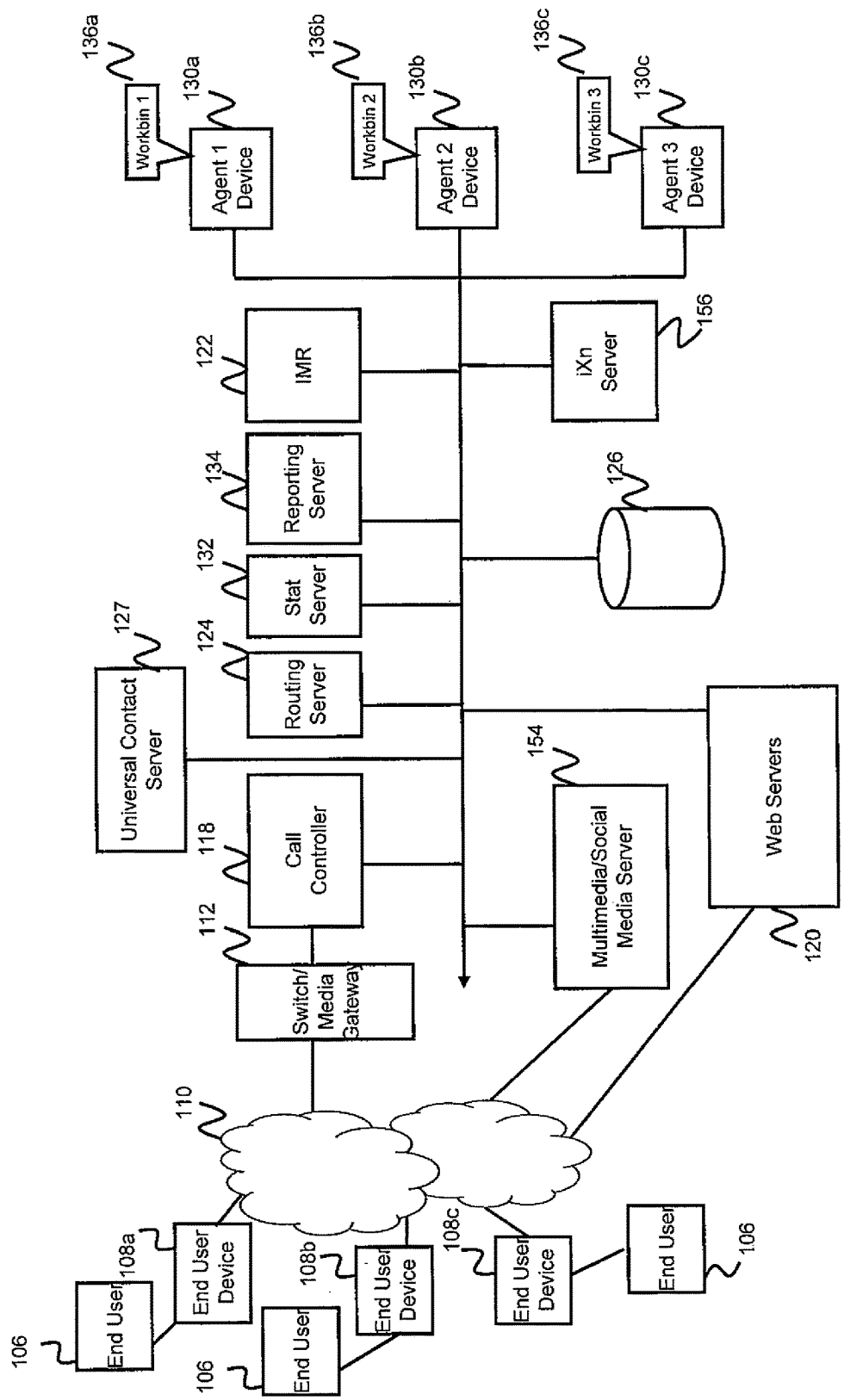
FIG. 1 is a schematic block diagram of a system for supporting a contact center in providing contact center services according to one exemplary embodiment of the invention

Hereinafter, example embodiments will be described in more detail with reference to the accompanying drawings, in which like reference numbers refer to like elements throughout. The present invention, however, may be embodied in various different forms, and should not be construed as being limited to the illustrated embodiments herein. Rather, these embodiments are provided as examples so that this disclosure will be thorough and complete, and will fully convey aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated.

Typically, a contact center system may be provisioned to maintain a certain peak load by committing resources to the system based on, for example, peak load estimates. However, commitment of resources based on peak load estimates may result in underutilization of some resources, which may lead to waste. For example, a contact center may expect a certain volume of incoming calls, and thus, may traditionally have a corresponding number of resources assigned to handle those calls. The resources needed to handle the calls may be actors (e.g. human agents, knowledge workers, and the like) and associated telephony objects (e.g. directory numbers and login object). Knowledge workers are temporary or part-time agents that may be invited ad hoc as needed.

In a traditional system, the resources assigned to handle the incoming calls are fully committed to the system. An actor commits to the system, for example, by logging in to a directory number (DN) and setting an activity status to "ready." The actor is committed regardless of whether he is actually providing a service or activity type for which, he is committed or not. The actor's DN is also committed to the system via registration of the DN on the telephony switch 112, regardless of whether an agent is actually logged in to the DN. In fact, in a traditional system, the DNs used by the contact center are automatically registered with the switch by default.

A resource that is committed with the system for providing certain services may be underutilized at times if there are less number of the certain services to be performed than there are committed resources. Committed resources that are idle create waste for the system since they may not be free to perform other types of tasks or they may be distracted from being fully focused on performing the other tasks. Also, a committed resource that is sitting idle creates waste by taking up resources that could be used by other resources. For example, certain telephony switches put a limit to the number of DNs that may be registered at a given time. A DN that is registered on the switch but not used for receiving calls may prevent another DN from being registered. In another example, there may be some license or usage related billing for resources that are committed (e.g., logged into the switch), and thus, while there may not be physical limitations as to the number of resources that can be committed, the license may be exceeded or unnecessary "usage" expenses may be created. In addition, committed resources are represented on one or more physical servers (e.g. call controller/SIP server 118) in order to track the state of the resources. The representation of the resources in the physical servers consumes computer resources such as memory and processor time, even if the resources are not being used to provide services.

Accordingly, one or more embodiments of the present invention are directed to systems and methods for dynamically committing or un-committing resources from a contact center system as needed or desired. In some embodiments, non-committed resources may be registered on a resource pool, without being fully allocated or fully committed to the contact center system, and the contact center system may dynamically commit or un-commit resources from the resource pool as needed or desired. According to one embodiment, non-committed resources that are registered on a resource pool without being committed to the contact center system are referred to as being pre-registered. In some embodiments, each of the resources registered in the resource pod may be committed to the contact center system, and the contact center system may un-commit resources in the resource pool as needed or desired.

According to one or more embodiments of the present invention, resources may be invited to join the resource pool when there are not enough resources in the resource pool. In one embodiment, actors acting on the resource (e.g., an agent or knowledge worker) may indicate availability or desire to join the resource pool by switching status in a status bar to available, for example. In one embodiment, the resource may be forced to join the resource pool when there are not enough volunteers to join the resource pool. In one embodiment, the resource may be offered an incentive or a reward for joining the pool to encourage more resources to voluntarily join the pool. In one embodiment, the resource may be scheduled to perform other tasks while being a member of the resource pool or indicating availability to join the resource pool if needed.

As will be appreciated by a person of skill in the art, one of the benefits of utilizing dynamic resource commitment from an unallocated pool of resources is that it helps contact centers to more efficiently use valuable and costly resources, like human agents, knowledge works, computer systems, telephony servers, and the like, while maintaining customer satisfaction. For example, during unexpected or predicted peak times, the contact center system may commit additional resources from the pool of unallocated resources as needed to handle the increased traffic. Similarly, during unexpected or predicted down times, the contact center system may un-commit resources from the contact center system as desired. Thus, unallocated computer systems or telephony servers may be on stand-by or may be turned off until needed, and unallocated live human agents may be more effectively used to handle back-office work, offline work, and the like, until needed.

FIG. 1 is a schematic block diagram of a system for supporting a contact center in providing contact center services according to one exemplary embodiment of the invention. The contact center may be an in-house facility to a business or enterprise for serving the enterprise in performing the functions of sales and service relative to the products and services available through the enterprise. In another aspect, the contact center may be operated by a third-party service provider. According to some embodiments, the contact center may operate as a hybrid system in which some components of the contact center system are hosted at the contact center premise and other components are hosted remotely (e.g., in a cloud-based environment). The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

According to one example embodiment, the contact center system manages resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers or end users, e.g., end users 106) desiring to receive services from the contact center may initiate inbound communications (e.g., telephony calls) to the contact center via their end user devices 108a-108c (collectively referenced as 108). Each of the end user devices 108 may be a communication device conventional in the art, such as, for example, a telephone, wireless phone, smart phone, personal computer, electronic tablet, and/or the like. Users operating the end user devices 108 may initiate, manage, and respond to telephone calls, emails, chats, text messaging, web-browsing sessions, and other multi-media transactions.

Inbound and outbound communications from and to the end user devices 108 may traverse a telephone, cellular, and/or data communication network 110 depending on the type of device that is being used. For example, the communications network 110 may include a private or public switched telephone network (PSTN), local area network (LAN), private wide area network (WAN), and/or public wide area network such as, for example, the Internet. The communications network 110 may also include a wireless carrier network including a code division multiple access (CDMA) network, global system for mobile communications (GSM) network, or any wireless network/technology conventional in the art, including but to limited to 3G, 4G, LTE, and the like.

According to one example embodiment, the contact center system includes a switch/media gateway 112 coupled to the communications network 110 for receiving and transmitting telephony calls between end users and the contact center. The switch/media gateway 112 may include a telephony switch or communication switch configured to function as a central switch for agent level routing within the center. The switch may be a hardware switching system or a soft switch implemented via software. For example, the switch 112 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

According to one exemplary embodiment of the invention, the switch is coupled to a call controller 118 which may, for example, serve as an adapter or interface between the switch and the remainder of the routing, monitoring, and other communication-handling components of the contact center.

The call controller 118 may be configured to process PSTN calls, VoIP calls, and the like. For example, the call controller 118 may be configured with computer-telephony integration (CTI) software for interfacing with the switch/media gateway and contact center equipment. In one embodiment, the call controller 118 may include a session initiation protocol (SIP) server for processing SIP calls. According to some exemplary embodiments, the call controller 118 may, for example, extract data about the customer interaction such as the caller's telephone number, often known as the automatic number identification (ANI) number, or the customer's internet protocol (1P) address, or email address, and communicate with other CC components in processing the interaction.

According to one exemplary embodiment of the invention, the system further includes an interactive media response (IMR) server 122, which may also be referred to as a self-help system, virtual assistant, or the like. The IMR server 122 may be similar to an interactive voice response (IVR) server, except that the IMR server 122 is not restricted to voice, but may cover a variety of media channels including voice. Taking voice as an example, however, the IMR server 122 may be configured with an IMR script for querying customers on their needs. For example, a contact center for a bank may tell customers, via the IMR script, to "press 1" if they wish to get an account balance. If this is the case, through continued interaction with the IMR server 122, customers may complete service without needing to speak with an agent. The IMR server 122 may also ask an open ended question such as, for example, "How can I help you?" and the customer may speak or otherwise enter a reason for contacting the contact center. The customer's response may then be used by a routing server 124 to route the call or communication to an appropriate contact center resource.

If the communication is to be routed to an agent, the call controller 118 interacts with the routing server (also referred to as an orchestration server) 124 to find an appropriate agent for processing the interaction. The selection of an appropriate agent for routing an inbound interaction may be based, for example, on a routing strategy employed by the routing server 124, and further based on information about agent availability, skills, and other routing parameters provided, for example, by a statistics server 132.

In some embodiments, the routing server 124 may query a customer database, which stores information about existing clients, such as contact information, service level agreement (SLA) requirements, nature of previous customer contacts and actions taken by contact center to resolve any customer issues, and the like. The database may be, for example, Cassandra or any NoSQL database, and may be stored in a mass storage device 126. The database may also be a SQL database and may be managed by any database management system such as, for example, Oracle, IBM DB2, Microsoft SQL server, Microsoft Access, PostgreSQL, MySQL, FoxPro, and SQLite. The routing server 124 may query the customer information from the customer database via an ANI or any other information collected by the IMR server 122.

Once an appropriate agent is identified as being available to handle a communication, a connection may be made between the customer and an agent device 130a-130c (collectively referenced as 130) of the identified agent. If the communication is a telephony call, the call is routed to a DN that is registered with the switch 112 to which an agent is logged in. Collected information about the customer and/or the customer's historical information may also be provided to the agent device for aiding the agent in better servicing the communication. In this regard, each agent device 130 may include a telephone adapted for regular telephone calls, VoIP calls, and the like. The agent device 130 may also include a computer for communicating with one or more servers of the contact center and performing data processing associated with contact center operations, and for interfacing with customers via voice and other multimedia communication mechanisms.

The contact center system may also include a multimedia/social media server 154 for engaging in media interactions other than voice interactions with the end user devices 108 and/or web servers 120. The media interactions may be related, for example, to email, vmail (voice mail through email), chat, video, text-messaging, web, social media, co-browsing, and the like. In this regard, the multimedia/social media server 154 may take the form of any IP router conventional in the art with specialized hardware and software for receiving, processing, and forwarding multi-media events.

The web servers 120 may include, for example, social interaction site hosts for a variety of known social interaction sites to which an end user may subscribe, such as, for example, Facebook, Twitter, and the like. In this regard, although in the embodiment of FIG. 1 the web servers 120 are depicted as being part of the contact center system, the web servers may also be provided by third parties and/or maintained outside of the contact center premise. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an interaction (iXn) server 156 interacts with the routing server 124 for selecting an appropriate agent to handle the activity. Once assigned to an agent, an activity may be pushed to the agent, or may appear in the agent's workbin 136a-136c (collectively referenced as 136) as a task to be completed by the agent. The agent's workbin may be implemented via any data structure conventional in the art, such as, for example, a linked list, array, and/or the like. The workbin 136 may be maintained, for example, in buffer memory of each agent device 130.

According to one exemplary embodiment of the invention, the mass storage device(s) 126 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be maintained in a customer relations management (CRM) database hosted in the mass storage device 126 or elsewhere. The mass storage device may take form of a hard disk or disk array as is conventional in the art.

According to some embodiments, the contact center system may include a universal contact server (UCS) 127, configured to retrieve information stored in the CRM database and direct information to be stored in the CRM database. The UCS 127 may also be configured to facilitate maintaining a history of customers' preferences and, interaction history, and to capture and store data regarding comments from agents, customer communication history, and the like.

The contact center system may also include a reporting server 134 configured to generate reports from data aggregated by the statistics server 132. Such reports may include near real-time reports or historical reports concerning the state of resources, such as, for example, average waiting time, abandonment rate, agent occupancy, and the like. The reports may be generated automatically or in response to specific requests (e.g., from agent/administrator, contact center application, and/or the like).

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In the various embodiments, the terms "interaction" and "communication" are used interchangeably, and generally refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like, or may refer to inter process communications between various entities (e.g., software modules).

Figure 2:
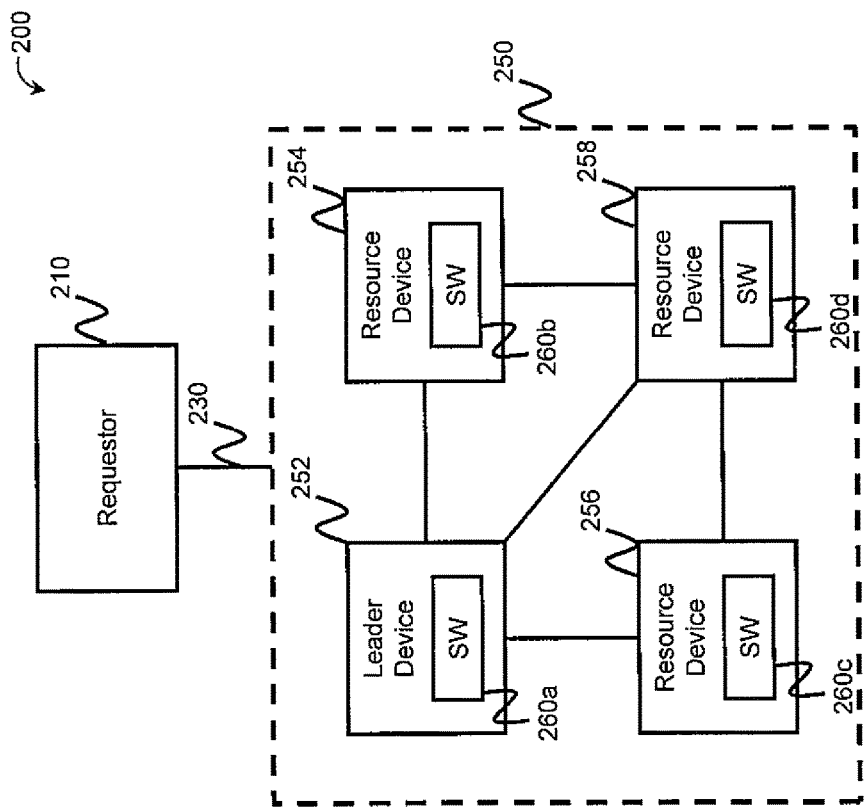
FIG. 2 is a block diagram of a resource pool according to an exemplary embodiment of the present invention.

FIG. 2 is a block diagram of a resource pool according to an exemplary embodiment of the present invention.

According to some embodiments, the contact center system may communicate with one or more resource pools 200 from which the contact center may commit resources to the system. Exemplary resources may include, without limitation, physical devices (e.g. computer systems, telephony servers, and the like), software objects (e.g. individual telephony objects such as directory numbers, login objects, and the like), and actors acting on the physical devices and/or telephony objects (e.g. human agents, knowledge workers, computerized automated systems, and the like). Each of the resources in the resource pool may be represented by a set of software objects/data structures that reference to the resource. For example, for agent resources, the resource pool objects may be comparable to virtual agent groups including all agents having a required skill to be a member of the resource pool. In this regard, any of the resources may be located in a different geographical location from that of the contact center system and from those of other resources.

According to one embodiment, when the contact center experiences an increase of incoming calls, the contact center system may pull or allocate resources from any of the resource pools, and commit the resources to enable use of the resources to provide a service or type of activity for the contact center. In this regard, the committed resource may be treated as any other ordinary resource that may be routed incoming calls according to routing strategies employed by the routing server 124.

Similarly, for example, when the contact center experiences a decrease in incoming calls, the contact center system may un-commit resources from the contact center system (e.g., by unregistering a DN for that resource from the switch/media gateway 112), and the un-committed or unallocated resource may be returned to any of the resource pools as needed or desired.

According to one embodiment, each of the resources in the resource pool may be committed to the contact center system, and may register with the resource pool to be uncommitted. In this regard, the resource pool may act as a staging area from which committed resources are uncommitted.

In some embodiments, at least one of the resource pools may communicate with a plurality of contact center systems, and any of the contact center systems may commit or un-commit resources from the corresponding resource pool as needed or desired.

Referring to FIG. 2, the resource pool 200 includes a requestor 210, a shared communication channel/medium 230, and a resource group 250. In some embodiments, the requestor 210 may not be part of the resource pool 200.

The resource group 250 may include a plurality of resource devices 252, 254, 256, and 258 that may be the actual resource to be committed or un-committed to or from the system, or a device acting on behalf of a resource (e.g. human agents or knowledge workers). According to one embodiment, each of the resource devices 252, 254, 256, and 258 may include a distributive software module (SW) 260a-260d (collectively 260) running thereon. While the resource group 250 as shown in FIG. 2 includes four resource devices 252, 254, 256, and 258, the present invention is not limited thereto, and the resource pool 200 may include any number of resource devices as those skilled in the art would appreciate.

In some embodiments, resources may be invited to join the resource pool when there are not enough resources in the resource pool, for example. In one embodiment, actors acting on the resource (e.g., agent or knowledge worker) may indicate (e.g., via a status bar) availability or desire to join the resource pool, and may make the final decision to join the resource pool. In one embodiment, the resource may be forced to join the resource pool as needed. In one embodiment, the resources may be encouraged to voluntarily join the pool by being offered an incentive or a reward for joining the resource pool.

The distributive software modules 260a-260d of each of the resource devices 252, 254, 256, and 258 are configured to communicate with each other via the communication channel 230 which may, in one embodiment, be implemented over a data communications network. The communication may be to distributively volunteer the respective resources in response to requests submitted by the requestor 210, without actively involving the actors (e.g., agents) associated with the resources. Hereinafter, unless otherwise explicitly described, each of the resource devices 252, 254, 256, and 248 and the respective SW modules running therein will be collectively referred to as a resource. However, it will be understood that when a resource is described as transmitting a signal or communicating on the communication channel, it is the SW module associated with the resource that is transmitting the signal or communicating on the communication channel.

According to some embodiments, all communications within the resource pool 200 are performed over the communication channel 230, and only members of the pool may communicate over the channel 230. For example, the communication channel 230 may be any suitable shared communication channel/medium (e.g., Twitter, Skype, WeChat, WhatsApp, and the like) on which the resources share communications with each other. According to some embodiments, when a message is transmitted over the channel 230 by any member of the pool, all other members of the pool receive the message concurrently (e.g. simultaneously or in the same order).

According to one embodiment, the requestor 210 may be configured to identify the number of resources to be assigned or allocated to the contact center system during any given time, and may transmit a request for such resources over the communication channel 230. For example, the requester 210 may predict traffic load (e.g., based on forecasting models) for the contact center or may receive the predicted or actual traffic load from another module or component of the contact center system, and may determine the number of additional resources that may be needed to handle increased traffic load, or the number of resources that may be released for decreased traffic load. However, the present invention is not limited thereto, and the number of resources to be added/released may be determined by another module or component of the contact center system, and the requestor 210 may act as a broker to pull or release the resources according to the determination.

As a person of skill in the art will appreciate, the forecasting models may be based on historical trends, statistical analyses, queue system theory, and the like, and may use well-known algorithms such as, for example, Erlang A, B, or C formulas.

As an example, forecasts may include making predictions relating to interaction volume, overhead, and staffing, for a particular forecast period. Forecasts may also be made in regards to usage of particular resources based on, for example, expected interaction volume. For example, occupancy of agents and/or media resources may be forecast based on predicted traffic to the contact center.

Forecasts may be based on parameters such as particular time periods of the day, certain days of the week, events, holidays, and the like. An event such as a sales promotion or marketing campaign, for example, may cause a predictable peak in interaction volume. Other events may cause shrinkage of available resources. For example, the forecast model may forecast a certain number of agents calling in sick on the day of the Super Bowl.

In a specific example, if 1000 calls are anticipated between 9:00 am and 9:15 am on Apr. 18, 2013, the predicted interaction volume for this period is 1000. The predicted staffing that is calculated to be needed to handle the 1000 calls may be, for example, 100 agents. However, if 10% of agents are predicted to not be available to handle the calls, the forecast staffing need may be 111 agents instead of 100. The prediction of 10% of the agents not being available may be due to agents taking vacations, calling in sick, or being engaged in other exceptions which may not be considered to be a work activity, such as, for example, training, meetings, breaks, meals, and other non-working states, resulting in shrinkage in the actual number of agents who are available to do the work.

In another example, forecasting models may indicate that inbound requests increase or decrease at particular time periods of the day, certain days of the week, during holidays, in response to specific events, and the like. For example, inbound requests may double on Mondays during 11:00 am and 2:00 pm. Such information may be used, for example, to decide whether spare capacity should be uncommitted from the contact center system back to the resource pool 200 to be shared with another contact center system or not. For example, although a contact center system may operate in spare capacity prior to 11:00 am, the contact center system may not uncommit the spare resources back to the resource pool 200 to make such resources available to other contact center systems after 10:30 am in anticipation of increased requests at 11:00 am.

The requester 210 may appoint any one of the resource devices 252, 254, 256, and 258 as a leader 252 of the resource group 250. For example, the requester 210 may appoint the first (e.g., first in time) resource device to join the resource group 250 as the leader 252 of the resource group 250. In one embodiment, the requester 210 may be a module or service running on, for example, the statistics sever 132 (e.g., see FIG. 1), but the present invention is not limited thereto, and the requester 210 may be a module or service running on any suitable server. In some embodiments, the requestor 210 and the leader 252 may be combined.

The request transmitted by the requestor 210 is received by the resources in the resource group 250 concurrently over the communication channel 230. According to one embodiment, the leader 252 processes the request via its software module 260 and engages in communication with the other resources in the pool during a raise round to seek volunteers to satisfy the request. According to one embodiment, the software module of each resource may be configured to automatically volunteer the corresponding resource, or not, during the raise round. Upon end of the raise round, the leader 252 engages in a commit round where the actors of the volunteering resources are notified to be committed to the system. In one embodiment, the resource may be automatically committed to the system in response to the notification. In one embodiment, the actor may be given the opportunity to accept or deny the commitment in response to the notification.

In some embodiments, each resource pool 200 may be associated with a particular channel type (also referred to as activity or service type), and each of the resources in the resource pool may have abilities or skills to interact via the particular channel type. For example, the channel type may be voice, chat, SMS, email, or the like. According to some embodiments, the channel type may be defined at a more granular level, indicating, for example, specific skills associated with each channel type. For example, the skills may include language skills, product knowledge, technical support, or the like. Those resources in the resource pool 200 capable of providing the service and/or having the skills defined for the channel type are allowed to join the resource pool or may be invited to join the resource pool.

However, the present invention is not limited thereto, and in some embodiments, the resource pool 200 may be a general-purpose resource pool, and the requestor 210 may specify the desired skills and/or the channel type in a request signal for requesting resources from the resource pool. For example, logic similar to skills based routing may apply where the requestor 210 initially specifies all required skills with appropriate proficiency. After timeout, the criteria may be relaxed (e.g., dropping less important skills and lowering proficiency thresholds). In one embodiment, the requestor 210 may specify a desired rate for the resource, and may initially try to commit resources with lower rates. For example, agents working on a contract basis or for business process outsourcing may have certain rates or costs for handling an activity, and the requestor 210 may specify the desired rate when requesting the resources from the resource pool.

Figure 3:
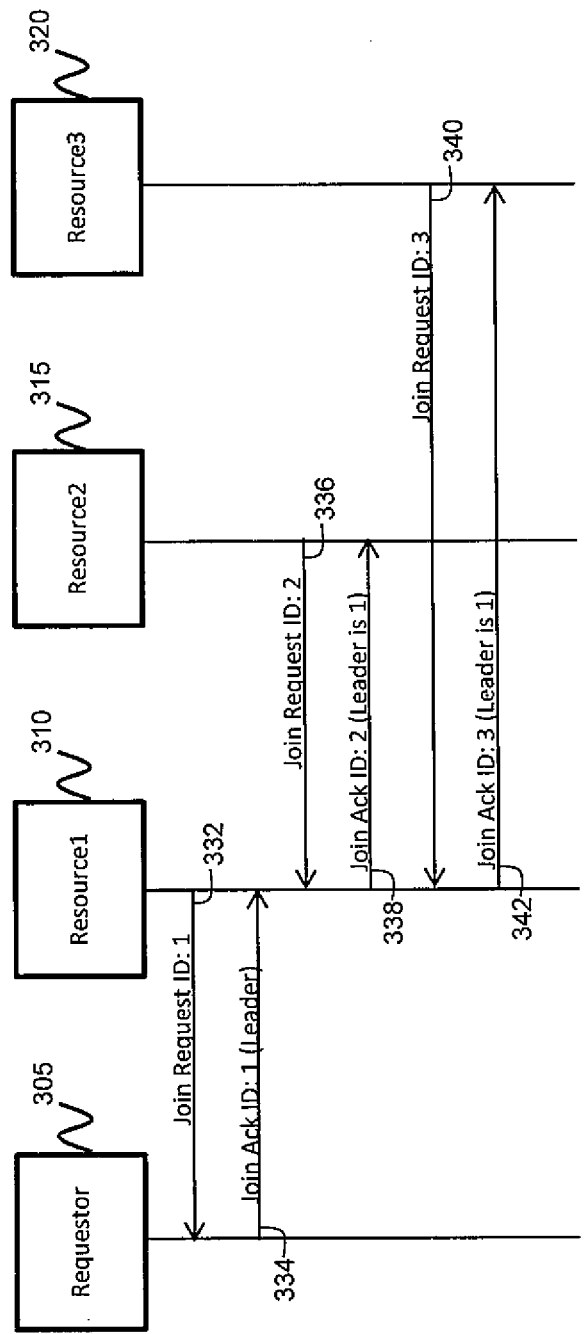
FIG. 3 is a signal flow diagram of a process for registering resources on a pool according to an exemplary embodiment of the present invention.

FIG. 3 is a signal flow diagram of a process for registering resources on a pool according to an exemplary embodiment of the present invention.

According to some embodiments, when a resource joins a pool, the resource, via its software module 260, requests membership into the pool via a communication channel allocated to the pool. If the pool has a leader, the leader controls membership into the pool. However, if the pool does not have a leader, a requestor 305 (similar to requestor 210 in FIG. 2) assigns a leader for the pool. However, the present invention is not limited thereto, and in one embodiment, the leader may be omitted, and the requester may function as the leader of the pool.

Referring to FIG. 3, a first resource 310 (similar to resource 252 in FIG. 2) transmits a join request signal to the communication channel of the pool at act 332. In this example, the pool is empty with no members at this point, and thus, the requestor 305 accepts the join request via the communication channel. The requestor 305 identifies the first resource 310 as the first member to join the pool, and assigns the first resource 310 as the leader at act 334. Thus, as the leader, the first resource 310 is now responsible for accepting membership into the pool.

Thereafter, a second resource 315 (similar to resource 254, 256, or 258 in FIG. 2) transmits a join request signal to the communication channel of the pool at act 336. Because the first resource 310 is the leader of the pool, the requestor 305 remains silent, and the first resource 310 responds to the join request via the communication channel. The first resource 310 accepts the join request, and at act 338, transmits an acceptance signal to the second resource 315 via the communication channel. The acceptance signal may identify the first resource 310 as the leader of the pool, and my include information of the relative position (e.g., joining order or rank) of the second resource 315 in the pool, the number of resources in the pool, and/or any other relevant data used by the members of the pool.

Thereafter, a third resource 320 (similar to resource 254, 256, or 258 in FIG. 2) transmits a join request signal to the communication channel of the pool at act 340. As the leader, the first resource 310 accepts the join request, and at act 342, transmits an acceptance signal to the third resource 320 via the communication channel. The acceptance signal may identify the first resource 310 as the leader of the pool, and my include information of the relative position (e.g., joining order) of the third resource 320 in the pool, the number of resources in the pool, and/or any other relevant data used by the members of the pool.

Figure 4:
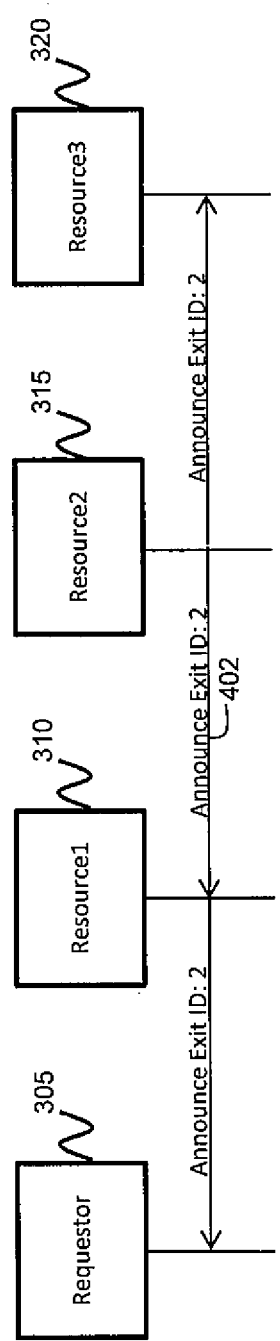
FIG. 4 is a signal flow diagram of a process for unregistering a non-leader resource from a pool according to an exemplary embodiment of the present invention.

FIG. 4 is a signal flow diagram of a process for unregistering a non-leader resource from a pool according to an exemplary embodiment of the present invention.

According to some embodiments, when a resource leaves a pool, the resource (e.g., the SW of the resource) announces exit from the pool via the communication channel. However, failure to announce exit may be permitted for failure cases. Thus, referring to FIG. 4, the second resource 315 transmits a leave request signal to the communication channel of the pool at act 402. Each of the first resource 310, the third resource 320, and the requestor 305 receives the leave request signal via the communication channel of the pool concurrently.

In an embodiment, each of the remaining resources having a relative position lower than that of the leaving resource moves up in relative position (e.g., renumbers their relative position by −1). Thus, in this example, the relative position of the third resource 320 is changed from 3 to 2, and the relative position of the leader 310 remains at 1 since the leader 310 has a higher relative position than that of the second resource 315 that left the pool.

Figure 5:
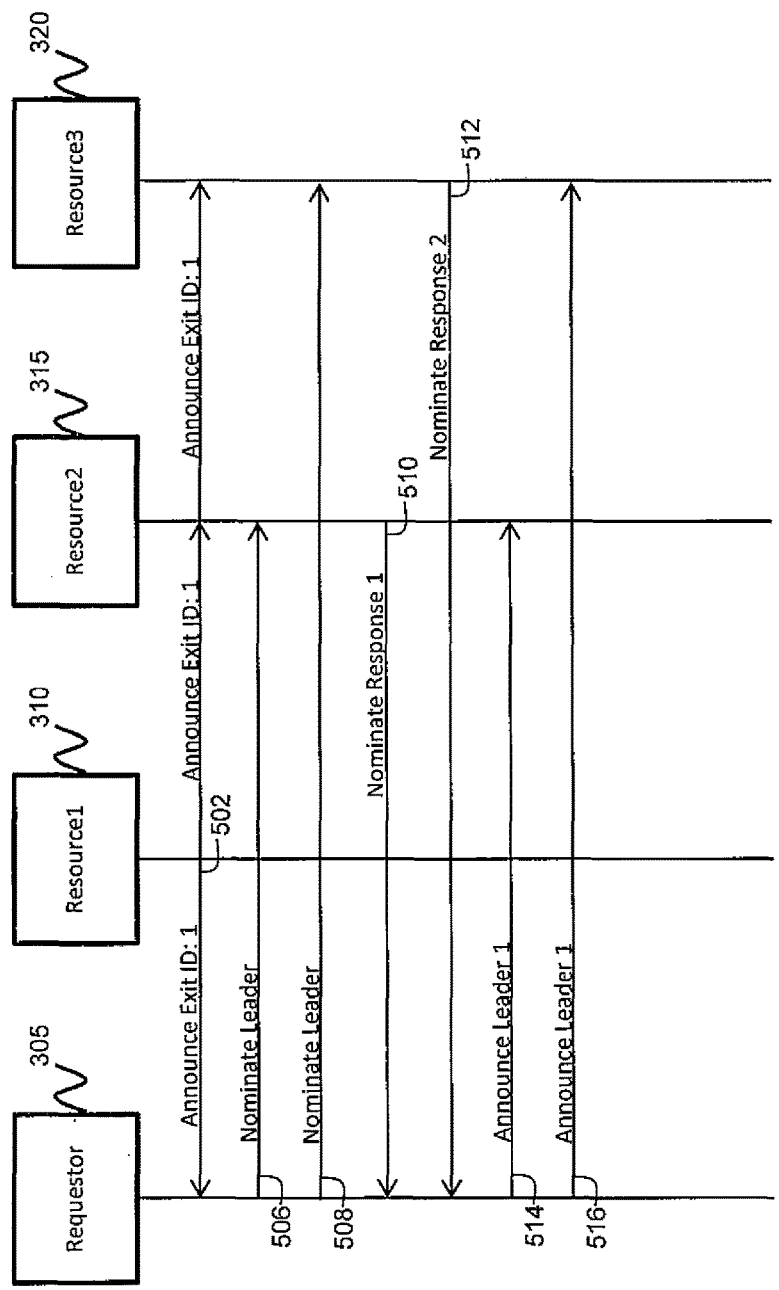
FIG. 5 is a signal flow diagram of a process for unregistering a leader resource from a pool according to an exemplary embodiment of the present invention.

FIG. 5 is a signal flow diagram of a process for unregistering a leader resource from a pool according to an exemplary embodiment of the present invention.

According to some embodiments, a leader may leave the pool, but should announce exit from the pool via the communication channel. However, until a new leader is assigned, the pool will be unable to handle requests. Thus, a new leader is assigned by the requestor 305 when the requestor 305 is on the communication channel.

Referring to FIG. 5, the first resource 310 (e.g., the SW on the first resource), which is the leader in this example, transmits a leave request signal to the communication channel of the pool at act 502. Each of the second resource 315, the third resource 320, and the requestor 305 receives the leave request signal via the communication channel of the pool concurrently.

In an embodiment, each of the remaining resources moves up in relative position (e.g., renumbers their relative position by −1). Thus, in this example, the relative position of the second resource 315 is changed from 2 to 1, and the relative position of the third resource 320 is changed from 3 to 2.

Further, now that the pool no longer has a leader, the requestor 305 assigns a new leader. Accordingly, the requestor 305 transmits a nomination signal via the communication channel to nominate a new leader. Thus, the second resource 315 receives the nomination signal via the communication channel at act 506, and the third resource 320 receives the nomination signal via the communication channel at act 508. In some embodiments, the nomination signal may specify targeted resources from among the resources 310-320 that are expected to respond.

The second resource 315 responds with its new relative position of 1 via the communication channel at act 510, and the third resource 320 responds with its new relative position of 2 via the communication channel at act 512. The requester receives the responses from the second and third resources 315 and 320 via the communication channel, and assigns the second resource 315 as the new leader based on having the highest relative position (e.g., the relative position updated to 1). Being at the top of the pool, the second resource 315 has a complete view of all participants in the pool. However, the present invention is not limited thereto, and in some embodiments, the requestor 305 may assign a resource that is not at the top of the pool (e.g., the third resource 315) as the leader. The requester 305 announces the new assigned leader via the communication channel at act 514 and 516, which is received by each of the second resource 315 and the third resource 320 via the communication channel.

Figure 6:
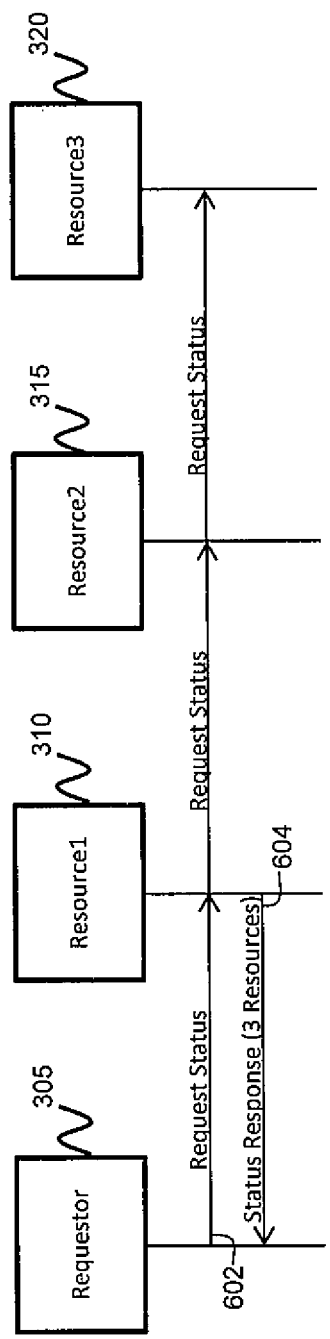
FIG. 6 is a signal flow diagram of a process that is executed when a requestor joins a pool when there is a leader according to an exemplary embodiment of the present invention.

FIG. 6 is a signal flow diagram of a process that is executed when a requestor joins a pool when there is a leader according to an exemplary embodiment of the present invention.

Referring to FIG. 6, when the requestor 305 joins the pool, the requester requests the current status of the pool. In this regard, the requester 305 transmits a status signal to the communication channel at act 602, and each of the first resource 310, the second resource 315, and the third resource 320 receives the status signal via the communication channel concurrently. Here, as the leader, the first resource 310 transmits a status response signal to the communication channel indicating the number of members in the pool at act 604, and the requestor 305 may assume, based on the response, that the first resource 310 is the leader of the pool, or the status response signal may include information indicating the identity of the leader. However, the present invention is not limited thereto, and in some embodiments, the request may target specific resources or a range of resources for the status of the pool. For example, the request may target resources having a relative position of 1 through 3 for the status of the pool, and at least one of those resources may respond to the request.

In some embodiments, if none of the members respond to the status request, the requestor 305 may assume that there is no leader currently assigned to the pool. In this case, the requestor 305 may initiate a nomination process similar to that shown in FIG. 5. However, the present invention is not limited thereto, and in some embodiments, the requestor 305 may clear the pool as shown in FIG. 7.

Figure 7:
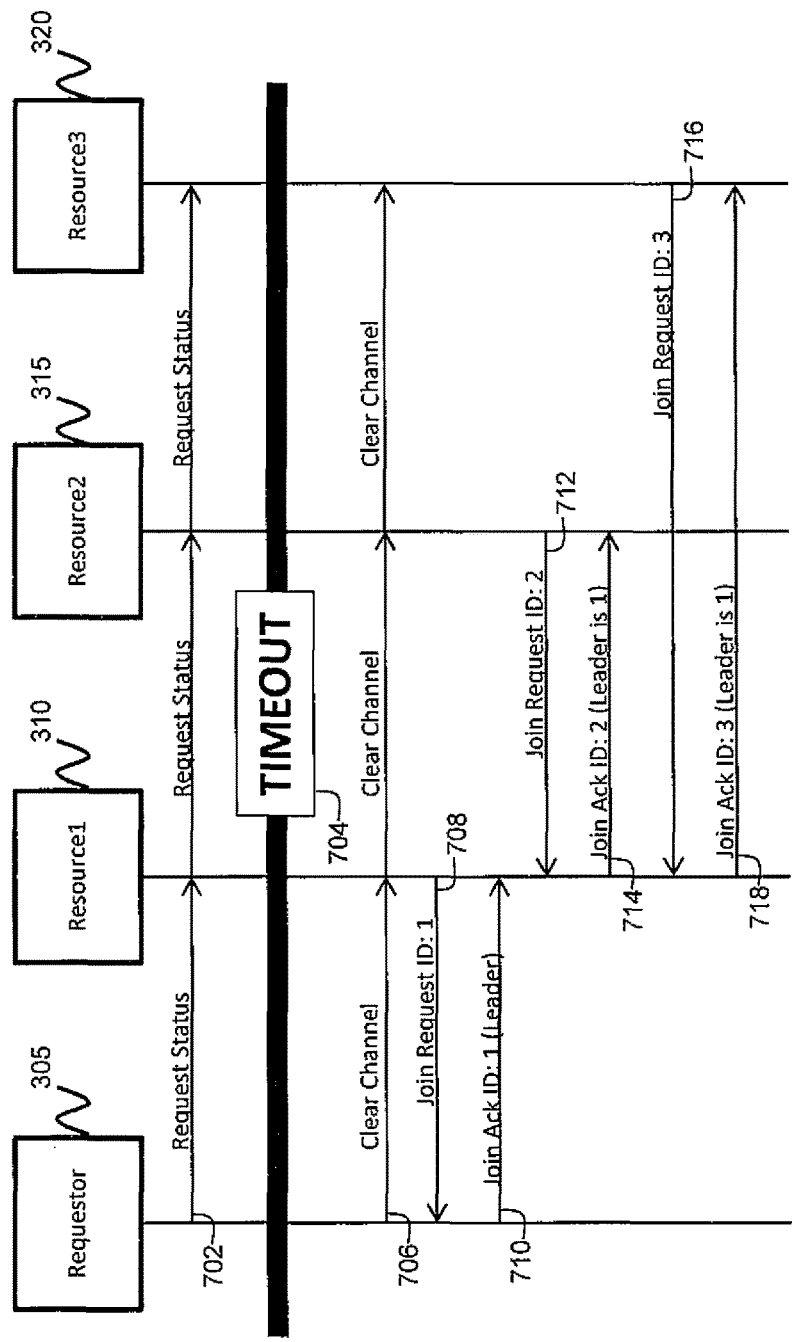
FIG. 7 is a signal flow diagram of a process that is executed when a requestor joins a pool when there is no leader according to an exemplary embodiment of the present invention.

FIG. 7 is a signal flow diagram of a process that is executed when a requestor joins a pool when there is no leader according to an exemplary embodiment of the present invention.

Referring to FIG. 7, when the requestor 305 joins the pool, the requestor requests the current status of the pool (e.g., by general request or by targeting specific resources or a range of resources). Accordingly, the requestor 305 transmits a status signal to the communication channel at act 702, and each of the first resource 310, the second resource 315, and the third resource 320 receives the status signal via the communication channel. In this example embodiment, there is no leader currently assigned to the pool, and thus, none of the resources respond to the status request before the status request times out at act 704. Accordingly, once the status request times out at act 704, the requestor 305 clears the pool at act 706. That is, the requestor 305 boots all resources out of the pool at act 706 by transmitting a clear channel signal to the communication channel.

Thereafter, each of the resources 310, 315, and 320 joins the pool by transmitting a join request signal to the communication channel. Because the pool was cleared, new positions within the pool may be determined in the order that the resource joins or rejoins the pool. For example, the first resource 310 transmits a join request signal to the communication channel at act 708, and here the first resource 310 is the first to join the pool. Thus, the requestor 305 assigns the first resource 310 as the leader. The requestor 305 transmits a response to the communication channel that the first resource 310 is the leader at act 710. As the leader, the first resource 310 now accepts the join requests of the other resources 315 and 320 as described above with reference to FIG. 3.

Figure 8:
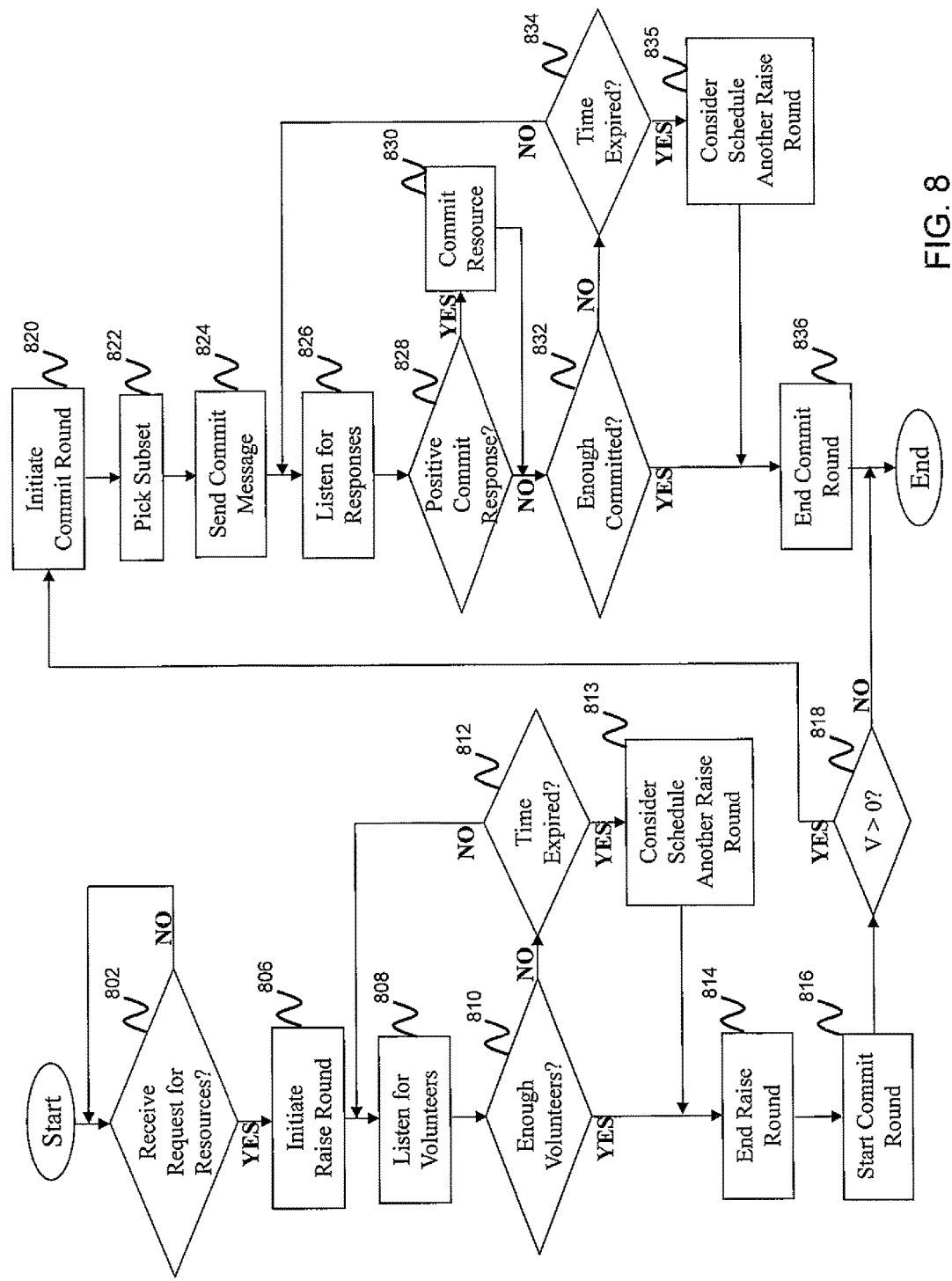
FIG. 8 is a flow diagram of a process for committing resources to the contact center system from a pool of resources according to an exemplary embodiment of the present invention.

FIG. 8 is a flow diagram of a process for committing resources to the contact center system from a pool of resources according to an exemplary embodiment of the present invention.

According to some embodiments, when the requestor 305 determines that there is a need for additional resources to be committed to the contact center system, the requestor broadcasts a request signal for additional resources over the shared communication channel 230. The requestor 305 may determine that there is a need for committing additional resources based on, for example, predicted or actual traffic load.

However, the present invention is not limited thereto, and in some embodiments, a particular resource from the pool may be committed to the contact center system based on, for example, agent request. For example, a particular agent may be processing a claim requiring a phone line to contact a customer, or a call may need to be transferred to a particular agent that does not yet have a phone line. In some embodiments, the contact center system may predict when a particular agent will need a phone line, for example, based on the agent's activities or based on customer's activities requiring skills of the particular agent. In these cases, the requestor may broadcast a request signal to commit the particular agent to the contact center system. For example, in some embodiments, a DN may be registered for the particular agent, and the DN may be registered temporarily or may be unregistered when no longer needed or when a higher priority task requires the DN.

In some embodiments, the request signal may include the number of requested resources (or an identifier corresponding to the particular agent) as well as a unique identifier for the request. However, the present invention is not limited thereto, and in some embodiments, the request signal may further include parameters used by the SW 260 of each of the resources to decide which of the resources is to be volunteered. For example, the request signal may further include at least one of a desired skill, desired skill level, desired channel type, desired geographic location of the resource, priority level of the task, start time, need time, etc. In some embodiments, the pool may contain a pool of committed resources, and the request signal may be used to un-commit a resource from the system.

Referring to FIG. 8, the method starts and the communication channel of a resource pool is monitored by the leader (e.g., the SW of the leader) of the resource pool, at act 802, for a request signal transmitted by the requestor. If no request signal is detected at act 802, the leader continues to monitor the communication channel.

If a request signal is detected at act 802, then the leader (e.g., the SW of the leader) initiates, at act 806, a raise round over the communication channel to solicit volunteers from the resource pool. At act 808, the leader listens for volunteers on the communication channel, and at act 810, determines whether or not there are enough volunteers for the request. In some embodiments, the raise round may be a timed session. Thus, if it is determined in act 810 that there are not enough volunteers, and time has not expired at 812, the process loops back to act 808, and the leader continues to monitor the communication channel for volunteers.

According to some embodiments, the SW (see FIG. 2) of each of the resource members in the pool autonomously applies various strategies to determine if they will volunteer the corresponding resource during the raise round. In some embodiments, for example, the SW may consider the total number of resources in the pool, potential response rates of other resources, time remaining in the raise round, own response rate, historical responses, preferences, custom priority levels set by a corresponding actor (e.g., live human agent) of the resource, etc. In some embodiments, if there are not enough volunteers, an incentive or reward may be offered to promote resources to volunteer during the present or subsequent raise round.

In some embodiments, when responding to the raise round, the responding resource (e.g., SW of the resource) may include some data (e.g., metadata) indicating the reasons why it volunteered and reasons why it should be selected during the commit round. This data may be fed into a neural net and optimized. For example, at the end of the commit round, it may be determined why the commit was successful, which may be teased out by a feedback process of the neural network. This data could be accessed by the SW of the resource when joining the pool or when deciding to volunteer the corresponding resource.

If it is determined at act 810 that there are enough volunteers, or if time has expired at act 812, the raise round ends at act 814. In one embodiment, if it is determined that there are not enough volunteers at act 810, but time has expired at act 812, the leader considers scheduling another raise round at act 813 to solicit more volunteers, and the raise round ends at act 814. In one embodiment, the subsequent raise round may run concurrently with the commit round at act 816.

At act 816, the leader (e.g., the SW of the leader) starts a timed commit round, and at act 818, determines if there are any volunteers from the raise round. If there are no volunteers, the process ends. If the leader determines that there is at least one volunteer from the raise round, then at act 820, the leader initiates a commit round. At act 822, the leader picks a subset of the volunteers corresponding to the request. For example, according to some embodiments, the leader may pick the subset of volunteers randomly or based on first-in-time. In some embodiments, the SW of the volunteering resource may transmit data including information about the resource. For example, the data may include some weighted busy status of the resource, such as keyboard or, mouse clicks per second, CPU bandwidth utilization, network performance utilization, and the like. In this case, the busier the resource, the less likely the resource will be selected to be committed. However, the present invention is not limited thereto. For example, if the number of volunteers are less than or equal to the requested number of volunteers, then act 822 may be skipped, and all of the volunteers may be selected for commitment to the system.

At act 824, the leader (e.g., the SW of the leader) sends a commit message on the communication channel. The commit message may identify the selected resources (or subset of resources) that volunteered during the raise round. These resources (e.g., actors on the resources) may then be notified to make a final decision to commit to the request.

For example, the final decision to commit may be autonomously performed by the respective SW of the resource, or through user confirmation (e.g., I accept) or reverse user confirmation (e.g., I do not accept). For example, when the resource is a computer system or telephony server, the SW module of the resource may commit to the request by, for example, powering on the computer system or telephony server. When the resource (or actor on the resource) is a live human agent, the SW module running on the corresponding resource device (e.g., agent's desktop) may cause a notification or message to appear on the resource device to accept or decline the commitment to the request.

At act 826, the leader (e.g., the SW of the leader) listens for commit responses. If the leader identifies a positive commit response at act 828, the corresponding resource is committed at act 830. In some embodiments, after confirming commitment to, the request, the requestor will send final instructions (e.g., login instructions, DN registration instructions, etc.) to the resource for fully committing to the contact center system. The final instructions may include instructions for exiting the pool. However, the present invention is not limited thereto, and in some embodiments, the resource may be automatically allocated to the contact center system and/or may be automatically removed from the pool.

According to some embodiments, after confirming the commitment to the request, a wait timeout may be initiated to prevent the resource from participating in additional raise rounds.

According to one embodiment, an agent resource commits to the system by logging in to a particular DN via his agent device 136, and setting a status indicator as "ready." According to one embodiment, the logging-in of the agent to the particular DN causes the DN to be registered with the switch 112. For example, the call controller/SIP server 118 may generate a message to the switch to register the DN. The registration of the DN may also occur upon detecting other activities of the agent, such as, for example, the agent lifting up the handset of the telephone associated with the DN. In this case, the telephone transmits a signal to the switch 112 for registering the DN. Thus, unlike the traditional systems where all DNs of the contact center were registered by default, embodiments of the present invention allow dynamic registration and un-registration of the DN, as well as other resources, based on detected need.

If there are no positive commit responses at act 828, or after the resource has been committed at act 830, at act 832, the leader (e.g., the SW of the leader) determines if there are enough committed resources, or if time has expired at act 834. If there are not enough committed resources and time has not expired, then the process loops back to act 826 to continue listening for commit responses. If there are enough committed resources at act 832, then the commit round ends at act 836 and the process ends. If there are not enough committed resources at act 832, but time has expired at act 834, then the leader considers scheduling another raise round at act 835 to solicit more volunteers, and the commit round ends at act 836, ending the process.

The flow and signaling diagrams described in the various embodiments are only exemplary. For example, the present invention is not limited to the sequence or number of the operations shown in the various flow and signaling diagrams, and the sequence or number of the operations can be altered into any desired sequence or number of operations as recognized by a person of ordinary skill in the art. For example, in some embodiments, the order may vary, or the method may include fewer or additional operations.

A person of skill in the art should appreciate that embodiments of the present invention allow resources to be dynamically committed or uncommitted from a contact center system as needed or desired. In some embodiments, each of the resources may include or be associated with a distributive software module that may communicate with each other via a shared communication channel to volunteer, in a distributed manner, resources to be committed to the contact center system from a pool of unallocated resources as needed or desired. However, the present invention is not limited thereto, and in some embodiments, the logic for managing members of the pool and/or committing/un-committing resources from the pool may be centralized, for example, in the requestor/leader.

FIGS. 9A to 9D are block diagrams of computing devices according to example embodiments of the present invention. FIG. 9E is a block diagram of a network environment including several computing devices according to an example embodiment of the present invention.

In one embodiment, each of the various servers, controllers, switches, gateways, engines, and/or modules (collectively referred to as servers) in the afore-described figures are implemented via hardware or firmware (e.g. ASIC) as will be appreciated by a person of skill in the art.

In one embodiment, each of the various servers, controllers, engines, and/or modules (collectively referred to as servers) in the afore-described figures may be a process or thread, running on one or more processors, in one or more computing devices 1500 (e.g., FIG. 9A, FIG. 9B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 9A:
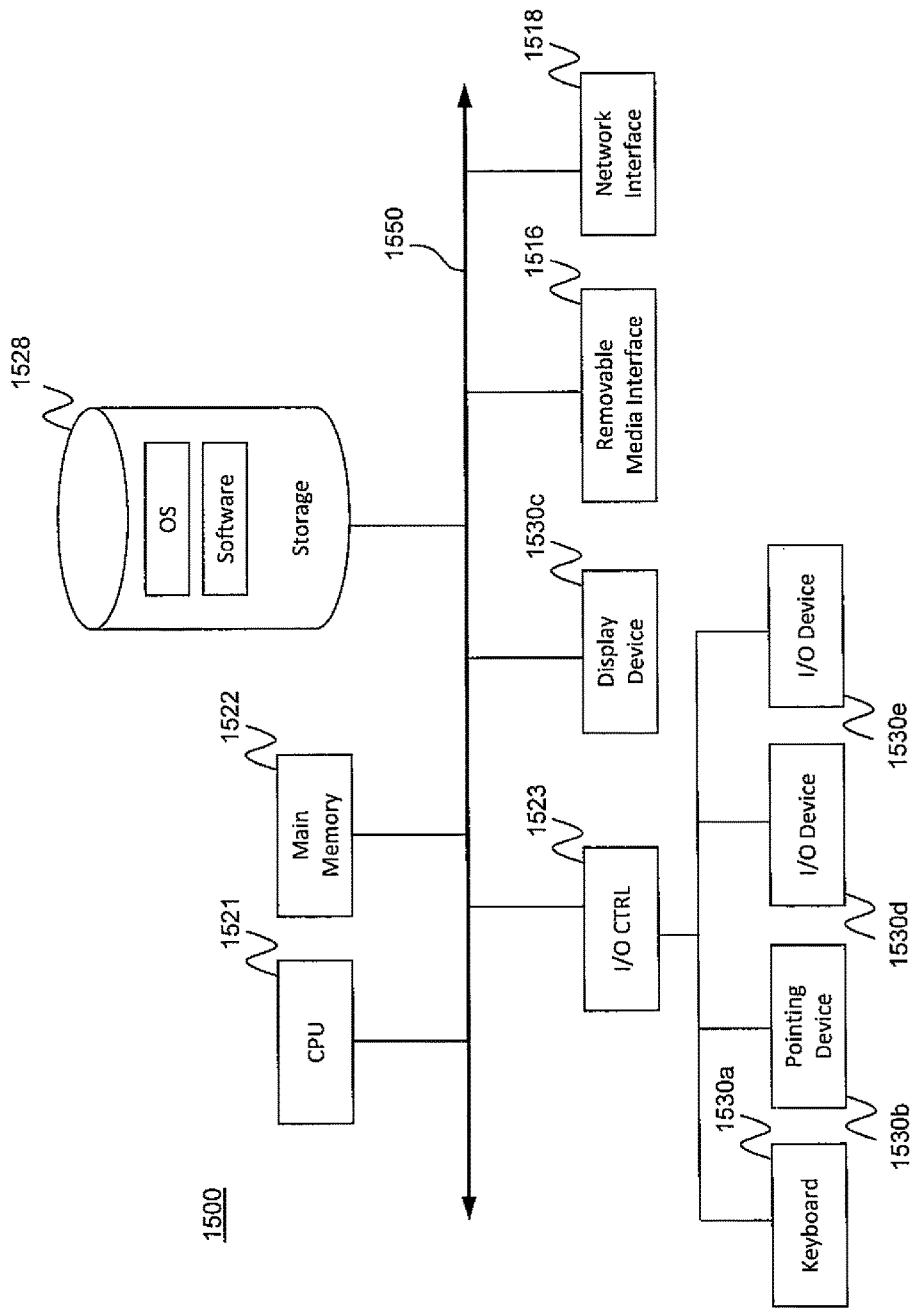
FIG. 9A is a block diagram of a computing device according to an exemplary embodiment of the present invention.
Figure 9B:
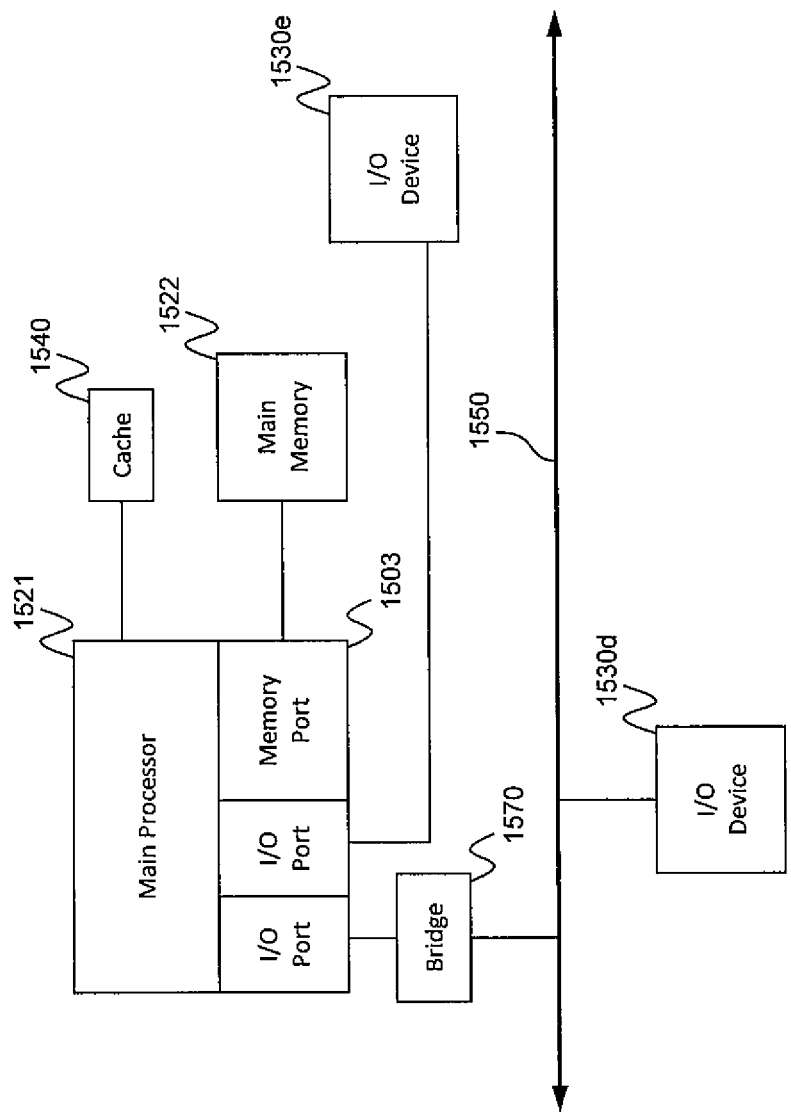
FIG. 9B is a block diagram of a computing device according to an exemplary embodiment of the present invention.
Figure 9D:
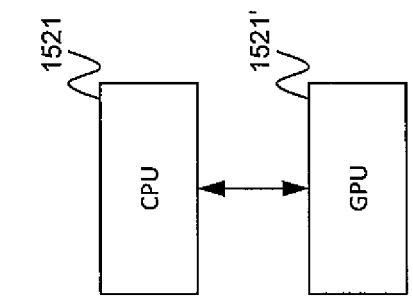
FIG. 9D is a block diagram of a computing device according to an exemplary embodiment of the present invention.

FIG. 9A and FIG. 9B depict block diagrams of a computing device 1500 as may be employed in exemplary embodiments of the present invention. Each computing device 1500 includes a central processing unit 1521 and a main memory unit 1522. As shown in FIG. 9A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 9B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 9A, the central processing unit 1521 communicates with the main memory 1522 via a system bus 1550. As shown in FIG. 9B, the central processing unit 1521 may also communicate directly with the main memory 1522 via a memory port 1503.

FIG. 9B depicts an embodiment in which the central processing unit 152 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 9A, the central processing unit 1521 communicates with various I/O devices 1530 via the local system bus 1550. Various buses may be used as the local system bus 1550, including a Video Electronics Standards Association (VESA) Local bus (VLB), an industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 9B depicts an embodiment of a computer 1500 in which the central processing unit 1521 communicates directly with I/O device 1530e. FIG. 9B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530*c*, speakers, and printers. An I/O controller 1523, as shown in FIG. 9A, may control the I/O devices. The I/O controller may control one or more I/O devices such as a keyboard 1530*a* and a pointing device 1530*b*, e.g., a mouse or optical pen.

Referring again to FIG. 9A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530*c*, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530*c* by the computing device 1500. For example, the computing device 1500 may include any type and/or form of video adapter, video card, driver, and/or library to interface, communicate, connect or otherwise use the display devices 1530*c*. In one embodiment, a video adapter may comprise multiple connectors to interface to multiple display devices 1530*c*. In other embodiments, the computing device 1500 may include multiple video adapters, with each video adapter connected to one or more of the display devices 1530*c*. In some embodiments, any portion of the operating system of the computing device 1500 may be configured for using multiple display devices 1530*c*. In other embodiments, one or more of the display devices 1530*c* may be provided by one or more other computing devices, connected, for example, to the computing device 1500 via a network. These embodiments may include any type of software designed and constructed to use the display device of another computing device as a second display device 1530*c* for the computing device 1500. One of ordinary skill in the art will recognize and appreciate the various ways and embodiments that a computing device 1500 may be configured to have multiple display devices 1530*c*.

A computing device 1500 of the sort depicted in FIG. 9A and FIG. 9B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 9C:
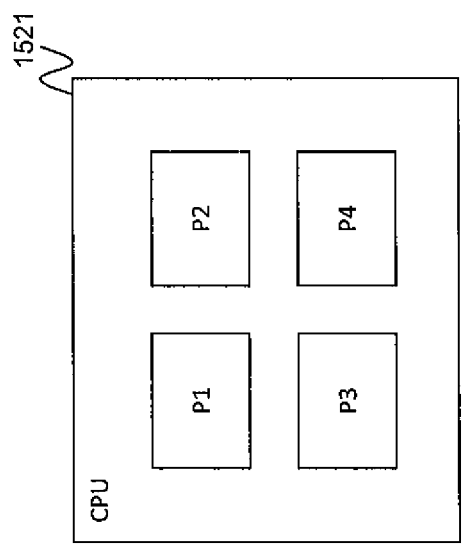
FIG. 9C is a block diagram of a computing device according to an exemplary embodiment of the present invention.
Figure 9E:
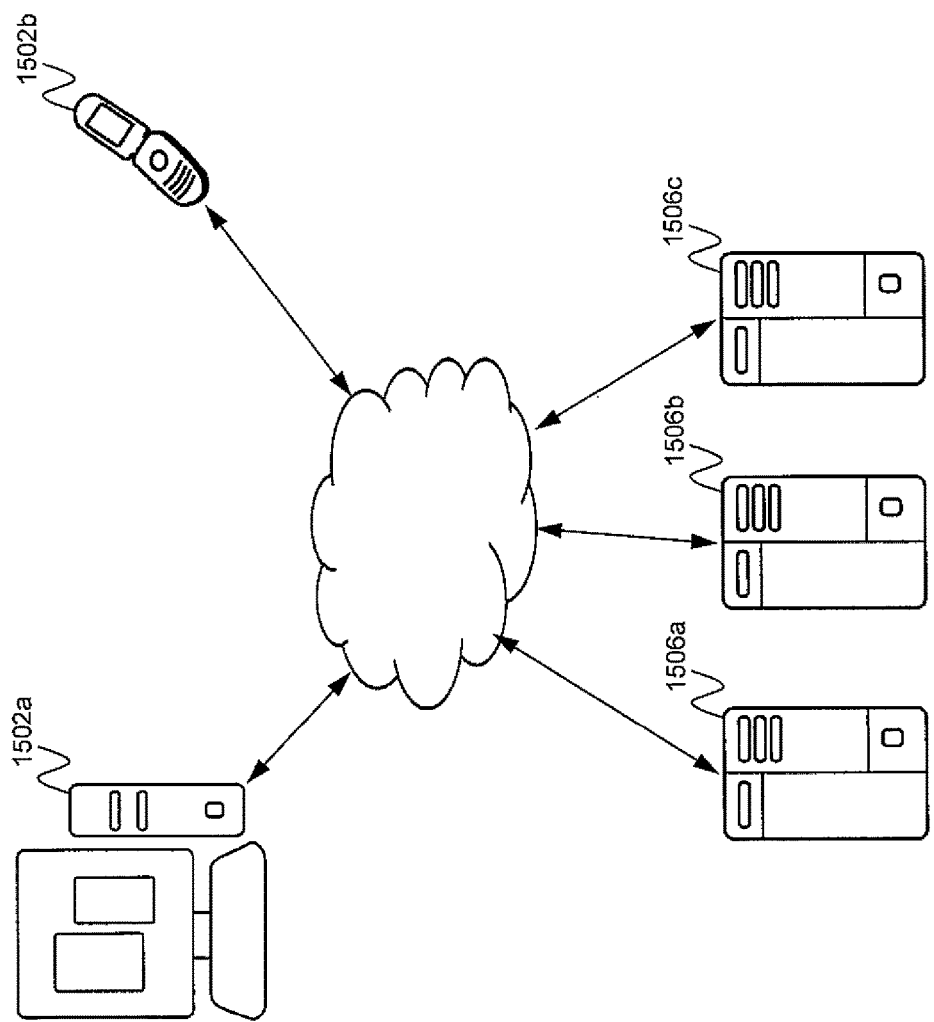
FIG. 9E is a block diagram of a network environment including several computing devices according to an exemplary embodiment of the present invention.

As shown in FIG. 9C; the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 9D, the computing device 1500 includes at least one central processing unit 1521 and at least one graphics processing unit 1521.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

A computing device may be one of a plurality of machines connected by a network, or it may comprise a plurality of machines so connected. FIG. 9E shows an exemplary network environment. The network environment comprises one or more local machines 1502*a*, 1502*b* (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506*a*, 1506*b*, 1506*c* (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502*a*, 1502*b*. Although only two clients 1502 and three server machines 1506 are illustrated in FIG. 9E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 9E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

Although the present invention has been described with reference to the example embodiments, those skilled in the art will recognize that various changes and modifications to the described embodiments may be performed, all without departing from the spirit and scope of the present invention. Descriptions of features or aspects within each example embodiment should typically be considered as available for other similar features or aspects in other example embodiments. Furthermore, those skilled in the various arts will recognize that the present invention described herein will suggest solutions to other tasks and adaptations for other applications. It is the applicant's intention to cover by the claims herein, all such uses of the present invention, and those changes and modifications which could be made to the example embodiments of the present invention herein chosen for the purpose of disclosure, all without departing from the spirit and scope of the present invention. Thus, the example embodiments of the present invention should be considered in all respects as illustrative and not restrictive, with the spirit and scope of the present invention being indicated by the appended claims, and their equivalents.

What is claimed is:

1. A system for managing resource commitment in a contact center, the system comprising:

a processor; and a memory coupled to the processor, wherein the memory stores instructions that, when executed by the processor, cause the processor to:

receive over a shared data communications channel a request for contact center resources, wherein the request is for handling activities for the contact center having an activity type;

transmit a signal to initiate a raise round according to the request over the shared data communications channel to a pool of resources registered to communicate on the shared data communications channel, wherein the pool of resources are non-committed resources, and wherein each resource in the pool of resources hosts logic for determining whether the resource should volunteer for the type of activity during the raise round, and in response to determining that the resource should volunteer, the host logic is configured to automatically transmit a volunteer signal over the shared data communications channel;

receive a plurality of volunteer signals from a plurality of volunteering resources from the pool of resources;

select one or more of the plurality of the volunteering resources for fulfilling the request;

transmit a message to the selected volunteering resources for committing the selected volunteering resources to the request, wherein the committed resources are selected for routing an activity having the activity type; and an electronic routing device coupled to the processor for routing the activity having the activity type, to the committed resources, for handling by the committed resources.

2. The system of claim 1, wherein the raise round signal is received by each of the resources in the pool concurrently via the shared data communications channel.

3. The system of claim 1, wherein the volunteer signals are received by each of the resources in the pool concurrently via the shared data communications channel.

4. The system of claim 3, wherein the determining of whether the resource should volunteer is based on a number of resources requested and how many other resources volunteer.

5. The system of claim 4, wherein the determining of whether the resource should volunteer is further based on a time remaining for the raise round.

6. The system of claim 3, wherein the determining of whether the resource should volunteer is based on the resource's own response rate to previous requests or response rates of other resources to previous requests.

7. The system of claim 1, wherein the pool of resources is associated with a particular skill, and each resource in the pool of resources has the particular skill.

8. The system of claim 1, wherein the request for contact center resources specifies a particular skill, and the determining of whether the resource should volunteer is based on whether the resource has the particular skill.

9. The system of claim 1, wherein at least one resource in the pool of resources is located in a different geographical location from other resources in the pool of resources.

10. The system of claim 1, wherein resources form among the pool of resources include at least one of a human agent, computer system, telephony server, and directory number.

11. A method for managing resource commitment in a contact center, the method comprising:

receiving, by a processor, over a shared data communications channel a request for contact center resources, wherein the request is for handling activities for the contact center having an activity type;

transmitting, by the processor, a signal to initiate a raise round according to the request over the shared data communications channel to a pool of resources registered to communicate on the data communications channel, wherein the pool of resources are non-committed resources, and wherein each resource in the pool of resources hosts logic for determining whether the resource should volunteer for the type of activity during the raise round, and in response to determining that the resource should volunteer, the host logic is configured to automatically transmit a volunteer signal over the data communications channel;

receiving, by the processor, a plurality of volunteer signals from a plurality of volunteering resources from the pool of resources;

selecting, by the processor, one or more of the plurality of the volunteering resources for fulfilling the request;

transmitting, by the processor, a message to the selected volunteering resources for committing the selected volunteering resources to the request; and routing, by an electronic device coupled to the processor, the activity having the activity type, to the committed resources, for handling by the committed resources.

12. The method of claim 11, wherein the raise round signal is received by each of the resources in the pool concurrently via the shared data communications channel.

13. The method of claim 11, wherein the volunteer signals are received by each of the resources in the pool concurrently via the shared data communications channel.

14. The method of claim 13, wherein the determining of whether the resource should volunteer is based on a number of resources requested and how many other resources volunteer.

15. The method of claim 14, wherein the determining of whether the resource should volunteer is further based on a time remaining for the raise round.

16. The method of claim 13, wherein the determining of whether the resource should volunteer is based on the resource's own response rate to previous requests or response rates of other resources to previous requests.

17. The method of claim 11, wherein the pool of resources is associated with a particular skill, and each resource in the pool of resources has the particular skill.

18. The method of claim 11, wherein the request for contact center resources specifies a particular skill, and the determining of whether the resource should volunteer is based on whether the resource has the particular skill.

19. The method of claim 11, wherein at least one resource in the pool of resources is located in a different geographical location from other resources in the pool of resources.

20. A system for managing resource commitment in a contact center, the system comprising:

means for receiving over a shared data communications channel a request for contact center resources, wherein the request is for handling activities for the contact center having an activity type;

means for transmitting a signal to initiate a raise round according to the request over the data communications channel to a pool of resources registered to communicate on the data communications channel, wherein the pool of resources are non-committed resources, and wherein each resource in the pool of resources hosts logic for determining whether the resource should volunteer for the type of activity during the raise round, and in response to determining that the resource should volunteer, the host logic is configured to automatically transmit a volunteer signal over the data communications channel;

means for receiving a plurality of volunteer signals from a plurality of volunteering resources from the pool of resources;

means for selecting one or more of the plurality of the volunteering resources for fulfilling the request;

means for transmitting a message to the selected volunteering resources for committing the selected volunteering resources to the request, wherein the committed resources are selected for routing an activity having the activity type; and means for routing the activity having the activity type, to the committed resources, for handling by the committed resources.

* * * * *